United States Patent
Duch et al.

(10) Patent No.: US 9,074,689 B2
(45) Date of Patent: Jul. 7, 2015

(54) ARRANGEMENT OF A WHEEL HUB CONNECTED TO A CONSTANT VELOCITY JOINT PROVIDED WITH A LOW FRICTION SEAL DEVICE

(71) Applicant: Aktiebolaget SKF, Göteborg (SE)

(72) Inventors: Daniele Duch, San Gillio (IT); Fausto Morello, Sommariva del Bosco (IT); Andrea Serafini, Pinerolo TO (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/306,444

(22) Filed: Jun. 17, 2014

(65) Prior Publication Data

US 2014/0374996 A1 Dec. 25, 2014

(30) Foreign Application Priority Data

Jun. 19, 2013 (IT) ............................... TO2013A0506

(51) Int. Cl.
| | |
|---|---|
| *F16C 33/78* | (2006.01) |
| *F16J 15/32* | (2006.01) |
| *B60B 27/00* | (2006.01) |
| *F16C 33/76* | (2006.01) |
| *F16C 33/80* | (2006.01) |
| *F16C 41/00* | (2006.01) |
| *F16C 33/58* | (2006.01) |
| *F16C 19/18* | (2006.01) |

(52) U.S. Cl.
CPC ......... *F16J 15/3232* (2013.01); *B60B 27/0073* (2013.01); *F16C 33/768* (2013.01); *F16C 33/7883* (2013.01); *F16C 33/80* (2013.01); *F16C 41/007* (2013.01); *F16C 19/186* (2013.01); *F16C 33/583* (2013.01); *F16C 2326/02* (2013.01); *F16D 2300/08* (2013.01)

(58) Field of Classification Search
CPC ...... F16J 15/32; F16J 15/3232; F16J 15/3268
See application file for complete search history.

(56) References Cited

U.S. PATENT DOCUMENTS

| 7,675,212 B2 * | 3/2010 | Kobayashi | ................... 310/90.5 |
| 8,720,904 B2 * | 5/2014 | Rossi | ............................. 277/572 |
| 2006/0188189 A1 * | 8/2006 | Serafini et al. | ................ 384/448 |

FOREIGN PATENT DOCUMENTS

| DE | 102008017409 A1 | 10/2009 |
| DE | 102008050127 A1 | 4/2010 |
| DE | 102011004422 A1 | 8/2012 |
| EP | 2042755 A2 | 4/2009 |

(Continued)

*Primary Examiner* — Gilbert Lee

(74) *Attorney, Agent, or Firm* — Bryan Peckjian; SKF USA Inc. Patent Dept.

(57) ABSTRACT

An arrangement including a first and second sealing assembly disposed between an inner ring and an outer ring of the wheel hub and straddling the wheel hub and an outer ring of a constant velocity joint, and an annular step formed on the side of the constant velocity joint on a radially outer lateral surface of the inner ring, in a position adjacent to a sleeve portion of a first shield of the first sealing assembly from a flange portion radially extends so as to protrude towards the outer ring, the flange portion being provided towards the constant velocity joint with a signal generating element (19) consisting of an annular insert; an end of a tubular core of the second sealing assembly is fitted angularly onto the step and is radially externally provided with an L-shaped edge arranged within the step and radially under the annular insert.

11 Claims, 1 Drawing Sheet

(56) References Cited

FOREIGN PATENT DOCUMENTS

| | | | |
|---|---|---|---|
| EP | 2043880 | A1 | 4/2009 |
| EP | 2541107 | A1 | 1/2013 |
| JP | H1193961 | A | 4/1999 |
| JP | 2007285374 | A | 11/2007 |
| JP | 2009197883 | A | 9/2009 |
| WO | 2009140996 | A | 9/2009 |

* cited by examiner

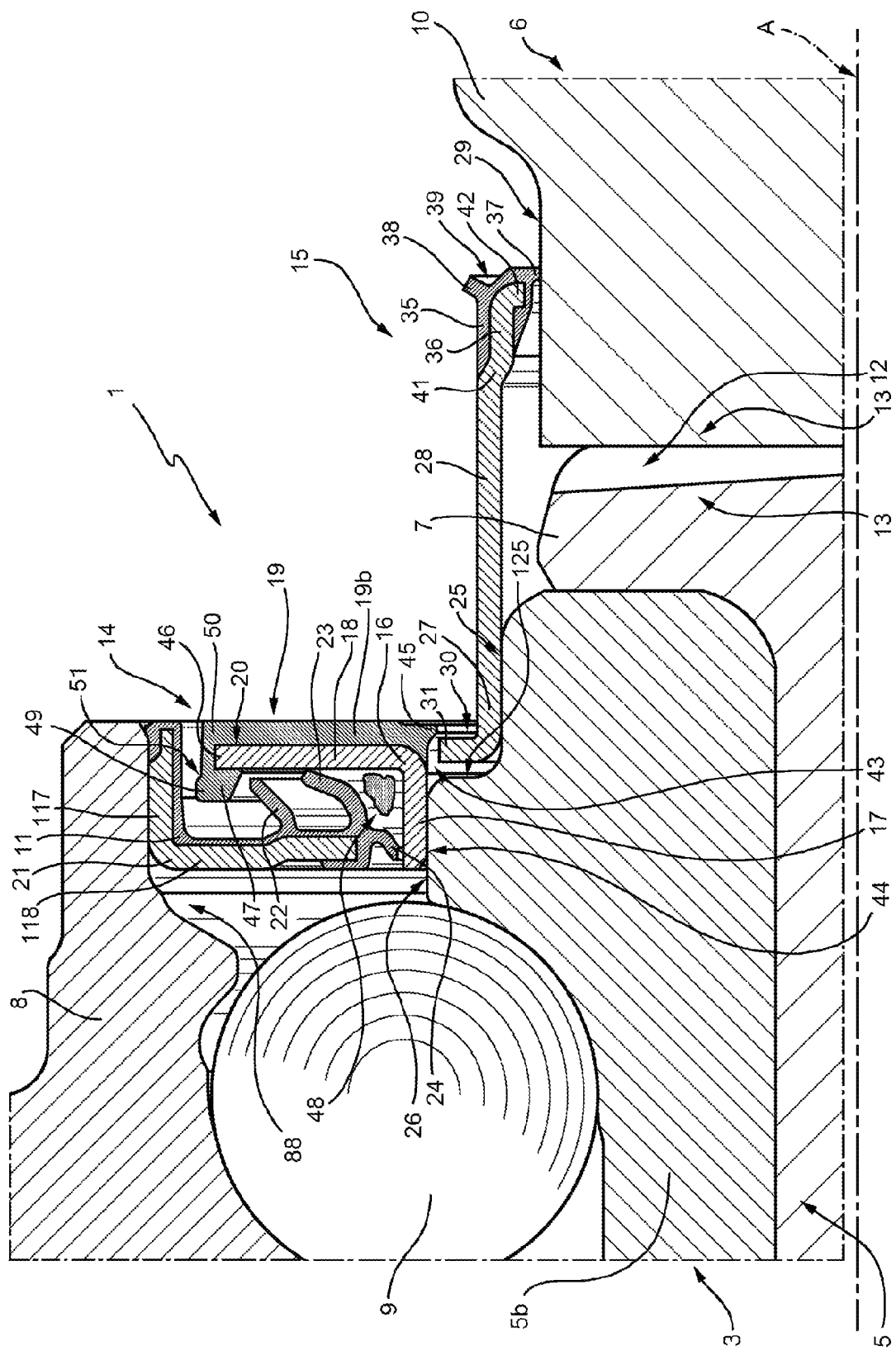

ARRANGEMENT OF A WHEEL HUB CONNECTED TO A CONSTANT VELOCITY JOINT PROVIDED WITH A LOW FRICTION SEAL DEVICE

CROSS-REFERENCE TO RELATED APPLICATIONS

This application claims priority to Italian Application TO2013A000506 file Jun. 19, 2013, the contents of which are herein fully incorporated by reference.

TECHNICAL FIELD OF THE INVENTION

The present invention relates to a low friction seal device for wheel hub assemblies connected to constant velocity joints and to the respective arrangement thereof.

BACKGROUND OF THE INVENTION

Wheel hub assemblies, on the one hand, support a vehicle wheel and, if the wheel is a drive wheel, are angularly connected to a related constant velocity joint for the transmission of the driving torque from the axle shaft to the wheel itself. Wheel hub assemblies have an axis of rotation and comprise an inner ring and an outer ring which are coaxial to each other and to the axis of rotation, and are rotatable with respect to each other due to the interposition therebetween of two crowns of rolling bodies.

KNOWN ART

The transmission of driving torque from the constant velocity joint to the wheel hub assembly is ensured by conjugated toothed means for transmitting motion, present on the adjacent and facing ends of the wheel hub and of the outer ring of the constant velocity joint; the toothed means may consist of a classical spline coupling, or of a front toothing pair, which couple head to head, as disclosed in WO2009/140996, in EP2042755, or again in EP2043880 (also published as WO2008/006339).

In particular, in the case of front toothings, the joint area between wheel hub and constant velocity joint is to be protected from infiltrations by outside contaminants (water, dust, mud, dirt); the same applies to the rolling bodies mounted interposed between the inner ring and the outer ring, which is provided with the means for securing the suspension to the upright.

Such a protection is obtained according to EP2043880 by means of a single sealing assembly obtained from two opposed shields, a first one fixed on the inner ring, on the side facing the constant velocity joint, and a second one fixed to the outer ring and carrying a sealing ring equipped with one or more sliding lips, which cooperate in contact with the first shield. The first shield has a complex shape made so that a protruding part thereof extends to cover the joint area. This protruding part may be provided, at least at the free end thereof, with an annular sealing seal which cooperates radially with the outer ring of the constant velocity joint; furthermore, the protruding part, or the face of a flange part of the first shield, facing in use the constant velocity joint may be provided with an annular signal generating element (also called "phonic wheel") formed, if the shield is made of ferromagnetic metal material, by alternating inserts and depressions, or by an annular portion made of a magnetizable plastic based material or of an elastomeric compound, magnetized so as to have alternating magnetized and non-magnetized areas, or areas with opposite polarities. Once in use coupled to a suitable sensor, the rotation of the "phonic wheel", which based on what is said is integral with the inner ring of the bearing, allows the rotation speed of the vehicle wheel to be detected, when coupled to a suitable sensor.

The solution according to EP2043880 is costly, complex to embody, and creates large bulks, both in radial and axial direction.

A solution is known from EP2541107 by the same Applicant, which brilliantly overcomes all the drawbacks of the known art. Nevertheless, although satisfactory, this solution involves reducing the radial extension of the magnetized rubber element forming the phonic wheel and which is carried by an independent shield restrained integral with the inner ring. Such a drawback could cause the generation in use of a signal that is not always strong enough.

DE102008050127 does not solve these problems.

SUMMARY OF THE INVENTION

It is the object of the present invention to provide an arrangement of a wheel hub assembly connected to a constant velocity joint provided with a seal device which does not have the drawbacks described above, is easy and affordable to embody, has increased protection efficiency of the rolling bodies and of the coupling area between joint and wheel hub and both reduced axial and radial bulks, all accompanied by the generation of an ever-strong and reliable magnetic signal and by a significant reduction of the friction generated by the sliding of the lips of the seal ring on the first shield.

Hence, based on the invention, an arrangement of a wheel hub assembly connected to a constant velocity joint and having a seal device is provided.

Thereby, a compact assembly structure is obtained of the device, with both reduced axial and radial bulks, which structure is easy to embody and mount, without subjecting the parts with substantial axial length to buckling stresses. An excellent fluid-tight seal is equally obtained of the areas adjacent to the joint and the wheel hub and, at the same time, the generation is ensured by the "phonic wheel" of an ever-reliable signal, combined with a strong reduction of the friction between the relatively mobile parts in contact of the seal device.

BRIEF DESCRIPTION OF THE DRAWINGS

Further features and advantages of the present invention will become more apparent from the following description of a non-limiting embodiment thereof, which diagrammatically illustrates a longitudinal view in radial section of a seal device, applied to a wheel hub assembly connected to a constant velocity joint according to the invention, which are illustrated only in part for simplicity.

DETAILED DESCRIPTION OF THE INVENTION

With reference to the above-mentioned figure, numeral 1 indicates a seal device as a whole for a wheel hub assembly 3, which inner ring 5 is operatively associated, for rotating integrally thereto, with a constant velocity joint 6, known and therefore illustrated only in part for simplicity. The wheel hub assembly 3 further comprises an outer ring 8 mounted coaxial and concentric with ring 5, radially externally to ring 5, and a plurality of rolling bodies 9 interposed between the rings 5 and 8. The inner ring 5 comprises a ring 5b, made as an independent element blocked axially by a rolled edge 7 and delimited externally by an outer cylindrical lateral surface 26, while the constant velocity joint 6 comprises an outer ring 10 (the only part of the constant velocity joint 6 that is shown in the drawing) provided with an outer cylindrical lateral surface 29, arranged normally substantially coaxial to ring 5, and with a toothed coupling 12 with the inner ring 5 having front toothing, obtained on reciprocally adjacent portions 13 of edge 7 and of the outer ring 10.

Device 1 comprises a first sealing assembly 14 interposed between the inner ring 5 (in this case ring 5b) and the outer ring 8 protecting the rolling bodies 9, and a second sealing assembly 15 integrally carried by the inner ring 5 (in this case ring 5b), arranged straddling the wheel hub 3 and the outer ring 10 of joint 6.

The sealing assembly 14 comprises: two shields 16 and 21 arranged facing each other and fitted angularly onto the inner ring 5 and inside the inner ring 8, respectively; and an annular sealing element 11 integrally carried, in the non-limiting embodiment disclosed, by shield 21 and comprising a plurality of annular lips 22, 23, 24 cooperating with shield 16 in the way disclosed below.

Shield 16 is L-shaped in radial section and in turn comprises a sleeve portion 17 anchored at surface 26 and a flange portion 18, which radially extends so as to protrude on the exterior from the sleeve portion 17 and towards the outer ring 8.

Shield 21 is also L-shaped in radial section and in turn comprises a sleeve portion 117 anchored angularly integral and fluid-tightly to ring 8, in particular within a front annular seat 88 of the outer ring 8 facing the constant velocity joint 6, and a flange portion 118, which radially extends so as to protrude on the interior of the sleeve portion 117 on the side opposite to the constant velocity joint 6 and towards the inner ring 5.

The flange portion 18, which is arranged in front of the flange portion 118 and within seat 88, supports, on a respective front surface 20 facing joint 6, a signal generating element 19 (generating a magnetic signal in the example disclosed) defined by a flat annular insert 19b, which has a substantially rectangular radial section with constant axial thickness, and is made of a magnetizable elastomeric or plastic synthetic material, which was magnetized and anchored to surface 20. The annular insert 19b has a plurality of magnetized and non-magnetized areas alternating about an axis A, or a plurality of magnetized areas with opposite polarity; once the element or annular insert 19b is operatively coupled with a sensor, known and not disclosed, such a sensor transduces the magnetic signal thus providing the rotation speed of ring 5.

Based on what is described, the shields 16 and 21 are therefore anchored by means of respective sleeve portions 17 and 117 thereof, to the inner ring 5 and to the outer ring 8, respectively, of the wheel hub 3 and the respective flange portions 18 and 118 of each shield 16 and 21 extend radially so as to protrude from the sleeve portions 17 and 117 towards the other shield.

The second sealing assembly 15 comprises a tubular core 28 having a first end 27 facing the side opposite to joint 6, and a second end 36 opposite to end 27 and therefore facing joint 6.

The tubular core 28 is generally made of a deep drawn metal material, is fitted angularly integral onto the inner ring 5, as will be described, by means of end 27 and axially extends so as to protrude from ring 5 (from ring 5b in particular), coaxial to ring 5 and towards joint 6, about the portions 13 of the wheel hub 3 and of joint 6.

According to the invention, the seal device 1 comprises, as an integral part thereof, an annular step 25 obtained on the side of the constant velocity joint 6 on a radially outer lateral surface 26 of the inner ring 5 (in this case of the insert ring or "small ring" or SIR 5b), in a position immediately adjacent to the sleeve portion 17 of shield 16.

In combination, end 27 of the tubular core 28 is fitted angularly integral onto the inner ring 5 of the wheel hub 3, precisely at the annular step 25, driven fluid-tightly, for example by slight interference, into step 25, and is radially externally provided with an L-shaped edge 31 shaped so as to couple into an annular seat 30 defined between the annular step 25 of the radially outer lateral surface 26 of the inner ring 5 and the annular insert 19b carried by the flange portion 17 of shield 16, which annular insert 19b axially extends so as to protrude over a part of the annular step 25, as is clearly visible in the drawing, and therefore protrudes axially for the whole axial length thereof, within the axial extension of step 25 on surface 26.

Thereby, the whole end 27 of the tubular core 28, and in particular the L-shaped edge 31 thereof, are entirely contained within the annular step 25 obtained on the lateral surface 26, accommodated within the annular step 25.

According to a further aspect of the invention, end 27 of the tubular core 28 is fluid-tightly coupled against and on the annular step 25 without necessarily cooperating in axial abutment against an axial shoulder 125 defined by the annular step 25 towards the constant velocity joint 6. In the non-limiting embodiment disclosed, there is a predetermined axial clearance between end 27 and shoulder 125.

Furthermore, the annular insert 19b forming the signal generating element 19 is realized as an annular insert of predetermined thickness, measured in the axial direction, which entirely covers surface 20, and which extends with a radially inner edge 43 thereof up to being flush with a radially inner lateral surface 44 of the sleeve portion 17 of shield 16.

Preferably, edge 43 is provided protruding-wise and towards the sealing assembly 15 with an annular protrusion 45 which extends so as to at least partially protrude into the annular step 25 and up to substantially being flush with the L-shaped edge 31 of end 27 of the tubular core 28.

In particular, the L-shaped edge 31 is adapted to define a first thrust shoulder for mounting the sealing assembly 15 on the inner ring 5. Thereby, the shoulder defined by the L-shaped edge 31 is carried by end 27 of core 28, which in use faces the mounting direction. Furthermore, once mounting is complete, edge 31 remains completely included within the axial bulk of the annular element 19 and therefore does not generate any increase in the axial bulk of core 28.

According to a further aspect of the invention, the annular insert 19b is shaped so as to extend beyond a radially outer edge 46 of the flange portion 18 of shield 16 opposite to the sleeve portion 17 and towards shield 21, in a position immediately facing, but spaced apart from, the sleeve portion 117 of shield 21, with an annular buttress 47 thereof arranged facing the flange portion 118 of shield 21 towards which the annular buttress 47 axially extends so as to protrude from the flange portion 18 of shield 16.

In combination, lip 22 of the annular sealing element 11 extends so as to protrude into an annular space enclosed between the shields 16 and 21, in a position immediately adjacent to buttress 47 of the annular insert 19b and between buttress 47 and the sleeve portion 17 of shield 16, so as to cooperate without sliding with the flange portion 18 of shield 16 and with buttress 47 to define a labyrinth seal between the shields 16, 21 and on the side of the sleeve portion 117 of shield 21.

In particular, the annular sealing element 11 is integrally carried by the flange portion 118 of shield 21 and the annular lip 22 obliquely extends in radial direction so as to protrude from the flange portion 118 and towards the sleeve portion 117, partially within the bulk in axial direction of buttress 47, but offset in radial direction with respect to buttress 47, so as to be radially interposed between buttress 47 and the sleeve portion 17 of shield 16.

The annular sealing element 11 further comprises at least a pair of further annular lips 23 and 24, which extend so as to protrude from the flange portion 118 in diverging directions, lip 23 to cooperate in sliding manner, by slight interference, with the flange portion 18, and lip 24 by forming a labyrinth seal with the sleeve portion 17 which lip 24 therefore does not slide on the sleeve portion 17; thereby, the lips 23, 24 define, with each other and with the first shield 16, an annular chamber 48 filled in use with lubricating grease and which is interposed in radial direction between the first lip 22 and the sleeve portion 17 of shield 16.

Preferably, the annular buttress 47 has an annular radial protrusion 49 on the side of shield 21, which protrusion extends towards the sleeve portion 117 of shield 21, thus forming a step 51 on a radially outer edge 50 of the annular insert 19b into which the radially outer edge 46 of the flange portion 18 is embedded, which step is arranged within the annular space enclosed between the shields 16, 21 and facing the constant velocity joint 6.

In addition to obtaining both reduced axial and radial bulks, by acting synergetically with end 27, the details described allow a centrifugation to be obtained of any contaminants attempting to get between the shields 16, 21 and into seat 30, thus allowing the traditional, possibly spring-loaded, sliding sealing lips to be replaced with a single, limited interference lip 23 and thus greatly reducing the friction generated in use by the seal device 1.

Not only is end 27 fluid-tightly coupled, for example by interference driving, with step 25 in the manner described, with the object of ensuring the fluid-tight protection of the adjacent portions of the inner ring 5 and of joint 6 (with the related front toothed coupling 12); end 36 is indeed also provided with an annular seal 35 made of elastomeric material and in turn comprising at least a first elastically deformable, annular lip 37 which radially extends so as to protrude from the second end 36, towards the interior of core 28 and on the opposite side with respect to the L-shaped edge 31 of first end 27, up to intercepting by interference the substantially cylindrical outer lateral surface 29 of the outer ring 10 of joint 6, so as to exert a static radial seal thereon.

The annular seal 35 also further comprises a second annular lip 38, which radially extends in oblique direction so as to protrude from end 36, substantially on the opposite side with respect to the annular lip 37 and in a position axially retracted towards end 27 with respect to lip 37, so as to delimit a front annular indentation 39 in seal 35 and towards lip 37, which indentation faces to the side of joint 6, and is adapted to allow lip 38 to act as a centrifuging element with regards to possible contaminants present in proximity of lip 37.

Furthermore, end 36 of the tubular core 28 has a diameter smaller than end 27 and is connected to the first end 27 by means of an obliquely folded step portion 41 of core 28, so as to increase the axial rigidity of core 28. Such a second end 36 of the tubular core 28 is entirely embedded into the annular seal 35.

According to a further aspect of the invention, in combination with that described above, end 36 of core 28 is radially internally provided with an L-shaped edge 42, which extends in direction opposite and parallel to the L-shaped edge 31 of end 27 and is embedded into seal 35, in the space between the lips 37 and 38, so as to form, when necessary, a further (second) thrust shoulder for mounting the sealing assembly 15 on the inner ring 5.

It is apparent from what is described that due to the synergetic combination of different features, and especially to the presence of step 25, an arrangement is obtained of wheel hub 3 guided by a constant velocity joint 6 in which there is more space for the signal generating element 19, thus ensuring the generation of an electric signal which is always strong and reliable and, at the same time, a drastic reduction of the friction generated by the seal device 1, the standard reduced axial and radial bulks in EP2541107 being the same.

The invention claimed is:

1. A wheel hub (3) assembly connected to a constant velocity joint (6) provided with a seal device (1) having a first sealing assembly (14) disposed between an inner ring (5) and an outer ring (8) of the wheel hub (3), and a second sealing assembly (15) supported by the inner ring (5) and arranged straddling the wheel hub (3) and an outer ring (10) of the constant velocity joint (6); wherein:

the first sealing assembly (14) comprises a first shield (16) and a second shield (21) anchored by means of their respective sleeve portions (17, 117) to the inner ring (5) and to the outer ring of the wheel hub, respectively, each having a respective flange portion (18, 118) that radially extends to protrude from the sleeve portion and towards the other shield, and an annular sealing element (11) supported by one of the first and second shields and provided with a plurality of annular sealing lips (22, 23, 24) that cooperate with the other shield; the first shield (16) having the flange portion (18) thereof arranged on the side of the constant velocity joint (6) and extends towards the outer ring (8), in front of the flange portion (118) of the second shield, and externally supports towards the constant velocity joint (6) a signal generating element (19) consisting of an annular insert (19b); and the second sealing assembly comprises a tubular core (28) having a first end (27), the tubular core integrally fitted angularly integral onto the inner ring (5); wherein i) the seal device comprises an annular step (25) on the side of the constant velocity joint (6) on a radially outer lateral surface (26) of the inner ring, in a position immediately adjacent to the sleeve portion (17) of the first shield (16);

ii)—the annular insert (19b) shaped to extend beyond a radially outer edge (46) of the flange portion of the first shield opposite to the sleeve portion of the first shield and towards the second shield (21), in a position immediately facing, but spaced apart from, the sleeve portion (117) of the second shield, with an annular buttress (47) thereof arranged facing the flange portion (118) of the second shield towards which the annular buttress (47) extends to axially protrude from the flange portion (18) of the first shield;

iii)—the annular sealing element (11) comprises at least a first annular lip (22) that extends to protrude into an annular space enclosed between the first (16) and the second (21) shield in a position immediately adjacent to the buttress (47) of the annular insert and between the buttress of the annular insert and the sleeve portion (17) of the first shield, to cooperate without sliding with the flange portion (18) of one of the first and second shields and with the buttress (47) of the annular insert to define a labyrinth seal between the first and second shields (16, 21) and on the side of the sleeve portion (117) of the second shield; and wherein iv) the first end (27) of the tubular core of the second sealing assembly faces the side opposite to the constant velocity joint (6) and is fitted angularly integral onto the inner ring (5) of the wheel hub at the annular step (25) of the radially outer lateral surface (26) of the inner ring; the first end (27) of the tubular core being radially externally provided with an L-shaped edge (31) shaped to couple into an annular seat (30) defined between the annular step (25) of the radially outer lateral surface (26) of the inner ring and the annular insert (19b) supported by the flange portion (18) of the first shield (16), wherein the annular insert (19b) axially extends to protrude over a part of the annular step (25); the annular insert (19b) forming the signal generating element (19) extending with a radially inner edge (43) thereof up to be flush with a radially inner lateral surface (44) of the sleeve portion (17) of the first shield; the radially inner edge (43) of the annular insert (19b) being provided protruding-wise and towards the second sealing assembly with an annular protrusion (45) that extends to at least partially protrude into the annular step (25) of the radially outer lateral surface (26) of the inner ring, substantially flush with the L-shaped edge (31) of the first end (27) of the tubular core of the second sealing assembly.

2. The arrangement according to claim 1, wherein the first end (27) of the tubular core (28) is fluid-tightly coupled against and on the annular step (25) of the radially outer lateral surface (26) of the inner ring (5), in axial abutment against an axial shoulder (125) defined by the annular step (25) towards the constant velocity joint (6); the L-shaped edge (31) of the first end of the tubular core being entirely contained within the annular step (25) of the radially outer lateral surface (26) of the inner ring.

3. The arrangement according to claim 1, wherein the tubular core (28) of the second sealing assembly (15) axially extends to protrude from the inner ring (5) and towards the constant velocity joint (6); the second sealing assembly (15) further comprising an annular seal (35) made of elastomer material and supported by a second end (36) of the tubular core opposite to the first end, comprising at least a second elastically deformable, annular lip (37) that radially extends to protrude from the second end (36) of the tubular core, towards the interior of the tubular core (28) and on the opposite side with respect to the L-shaped edge (31) of the first end (27) of the tubular core, up to intercept by interference a substantially cylindrical, outer lateral surface (29) of the outer ring (10) of the constant velocity joint, to exert a radial seal thereon.

4. The arrangement according to claim 3, wherein the second end of the annular core is radially internally provided with an L-shaped edge (42) on the opposite side with respect to the L-shaped edge (31) of the first end; the L-shaped edge (42) of the second end being entirely embedded into the annular seal (35); the L-shaped edges (31, 42) of the first and second ends of the tubular core (28) being adapted to define respective thrust shoulders for mounting the second sealing assembly on the annular step (25) of the radially outer surface of the inner ring.

5. The arrangement according to claim 4, wherein the annular seal (35) supported by the second end (36) of the core further comprises a third annular lip (38), which radially extends in oblique direction so as to protrude from the second end (36) of the tubular core, substantially on the opposite side with respect to the second annular lip (37) and in a position axially retracted towards the first end (27) of the tubular core with respect to the first lip (37), to delimit a front annular indentation (39) in the seal and towards the second lip, which indentation is adapted to allow the third lip (38) to act as a centrifuging element with regards to possible contaminants present in proximity of the second lip.

6. The arrangement according to claim 4, wherein the second end (36) of the tubular core (28) has a diameter smaller than the first end (27) and is connected to the first end by means of an obliquely folded step portion (41) of the core, to increase the axial rigidity of the tubular core (28); the whole second end (36) of the tubular core being embedded into the annular seal (35) belonging to the second sealing assembly (15).

7. The arrangement according to claim 1, wherein the annular sealing element (11) of the first sealing assembly is supported by the flange portion (118) of the second shield (21), which radially extends to protrude from the sleeve portion (117) of the second shield on the side opposite to the constant velocity joint (6) and towards the inner ring (5) of the wheel hub; the first annular lip (22) obliquely extends in radial direction to protrude from the flange portion (118) of the second shield and towards the sleeve portion (117) of the second shield partially within an axial bulk of the buttress (47) of the annular insert, to be radially interposed between the buttress (47) and the sleeve portion (17) of the first shield.

8. The arrangement according to claim 7, wherein the annular sealing element (11) of the first sealing assembly further comprises at least a fourth (23) and a fifth (24) annular lip, which extend to protrude from the flange portion (118) of the second shield in diverging directions, the fourth lip (23) for cooperating in sliding manner with the flange portion (18) and the fifth lip (24) by forming a labyrinth seal with the sleeve portion (17) of the first shield, respectively, to define an annular chamber (48) therebetween and with the first shield (16), and where the chamber is filled with lubricating grease and is disposed in radial direction between the first lip (22) and the sleeve portion (17) of the first shield.

9. The arrangement according to claim 1, wherein the annular insert (19b) forming the signal generating element (19) is realized as an annular insert of predetermined thickness, measured in the axial direction, of a magnetizable elastomeric or plastic synthetic material, which has been chemically anchored to a first front surface (20) of the flange portion of the first shield (16) facing the constant velocity joint (6), to entirely cover it.

10. The arrangement according to claim 1, wherein the annular buttress (47) of the annular inset (19b) defining the signal generating element has an annular radial protrusion (49) on the side of the second shield (21), which protrusion extends towards the sleeve portion (117) of the second shield, thus forming a step (51) on a radially outer edge (50) of the annular insert that the radially outer edge (46) of the flange portion of the first shield is embedded, which step is arranged within the annular space enclosed between the first and second shields (16, 21) and facing the constant velocity joint (6).

11. The arrangement according to claim 1, wherein the first end (27) of the tubular core (28) is fluid-tightly coupled against and on the annular step (25) of the radially outer lateral surface (26) of the inner ring (5), without axially abutting against an axial shoulder (125) defined by the annular step (25) towards the constant velocity joint (6); the L-shaped edge (31) of the first end of the tubular core being entirely contained within the annular step (25) of the radially outer lateral surface (26) of the inner ring.

* * * * *